United States Patent Office 3,506,464
Patented Apr. 14, 1970

3,506,464
OPAL GLASS COMPOSITIONS
Nils Tryggve E. A. Baak, Ridgefield, Conn., and Charles F. Rapp, Toledo, Ohio, assignors to Owens-Illinois, Inc., a corporation of Ohio
No Drawing. Filed June 17, 1966, Ser. No. 558,265
Int. Cl. C03c 3/08
U.S. Cl. 106—54      7 Claims

ABSTRACT OF THE DISCLOSURE

An opal glass composition wherein the glass consists essentially of 78 to 85 mole percent $SiO_2$, 7 to 11 mole percent $B_2O_3$, 0 to 6 mole percent $Al_2O_3$, 3 to 6 mole percent $Na_2O$, and 1 to 6 mole percent $P_2O_5$. The glass has a coefficient of thermal expansion within the range of 25 to $40 \times 10^{-7}/°C.$ (0-300° C.).

---

The present invention pertains to the glass art, and, more particularly, to novel glass compositions. Specifically, the instant invention relates to novel opal borosilicate glasses possessing a medium thermal coefficient of expansion.

The principal object of the present invention is to provide novel glass compositions.

A further object of this invention is to provide opal glass compositions.

Yet a further object of the instant invention is to provide opal borosilicate glasses.

Still a further object of the subject invention is to effect opal glasses possessing relatively low thermal coefficient of expansion.

Still further objects and advantages will be apparent to those versed in the art from the detailed disclosure and claims which follow.

According to the present invention, there is provided a novel family of opal glass compositions. The expression "opal glass" as used herein generally denotes glasses which possess light diffusing properties or phases therein to render said glasses essentially light diffusing or endowed with translucent effects. The opal glasses of the subject invention have an expansion coefficient in the range of 25 to $40 \times 10^{-7}/°$ C. (0-300° C.) with the now preferred range of about 30 to $35 \times 10^{-7}/°$ C. The opal borosilicate family of the instant invention generally contains the acidic oxides of the $RO_2$ group, the $R_2O_3$ group, and the $R_2O_5$ group, and the alkaline oxide of the $R_2O$ group. The oxides of the above groups presently employed in the subject glasses include the acidic oxides silicon dioxide, $SiO_2$, boric oxide, $B_2O_3$, aluminum oxide, $Al_2O_3$, and phosphorus pentoxide, $P_2O_5$, and the alkaline oxide sodium oxide, $Na_2O$.

The components of the novel opal borosilicate glass compositions, as set forth immediately below, are present in the following inventive proportions: a glass consisting essentially of 78 to 85 mole percent $SiO_2$, 7 to 11 mole percent $B_2O_3$, 0 to 3 mole percent $Al_2O_3$, 3 to 6 mole percent $Na_2O$, and 1 to 6 mole percent $P_2O_5$; a glass composition consisting essentially of 78 to 85 mole percent $SiO_2$, 7 to 11 mole percent $B_2O_3$, 4 to 6 mole percent $Na_2O$, and 1 to 6 mole percent $P_2O_5$; a glass consisting of 78 to 85 mole percent $SiO_2$, 7 to 11 mole percent $B_2O_3$, 1 to 3 mole percent $Al_2O_3$, 3 to 6 mole percent $Na_2O$, and 1 to 6 mole percent $P_2O_5$; and a glass consisting essentially of 78 to 85 mole percent $SiO_2$, 7 to 11 mole percent $B_2O_3$, 3 to 6 mole percent $P_2O_5$, 0 to 3 mole percent $Al_2O_3$, and 3 to 6 mole percent $Na_2O$. The subject glasses are further characterized by a total $B_2O_3+P_2O_5$ content of 8 to 17 mole percent, a total $SiO_2+B_2O_3$ content of 85 to 96 mole percent, and a total $SiO_2+Al_2O_3$ content of 78 to 88 mole percent.

The presently-preferred component ranges for the ingredients of the opal glasses of the present invention include a glass consisting essentially of 80 to 85 mole percent $SiO_2$, 9 to 11 mole percent $B_2O_3$, 1 to 3 mole percent $Al_2O_3$, 4 to 6 mole percent $Na_2O$, and 1 to 6 mole percent $P_2O_5$; and a glass consisting essentially of 80 to 85 mole percent $SiO_2$, 9 to 11 mole percent $B_2O_3$, 4 to 6 mole percent $Na_2O$, and 1 to 5 mole percent $P_2O_5$.

In preparing the opal borosilicate glasses of the above compositional range, the batch ingredients are intimately mixed and heated to such temperature so that all substances are present in the liquid state, thereby enabling the formation of a glass from a homogeneous melt. The batch ingredients used for the subject glasses were mixed well by hand or in a commercially-available standard laboratory V-blender. The mixed batch materials were conveniently melted in a 90% platinum-10% rhodium crucible in an electrically heated furnace, at a temperature of 1500 to 1600° C. in an air atmosphere. The melts were heated at this temperature for 16 to 24 hours. After the melts had cooled to room temperature, they were usually crushed and remelted at 1500 to 1600° C. overnight, to insure homogeneity. The subject glasses prepared from the described melts generally exhibited melting and forming characteristics adaptable for the fabrication of glass items of commerce by standard conventional procedures.

The batch materials employed for preparing the glasses were the high purity commercially-available materials and were selected from the following: $SiO_2$ Kona Quintas Quartz, $Al_2O_3$ Alcoa A-14, $B_2O_3$ Baker purified reagent, $AlPO_4$ Fisher purified reagent and Fisher certified or Baker analyzed reagents: $Na_2CO_3$, $NaPO_3$ and $P_2O_5$.

The following examples are set forth as representative batch components and glasses prepared according to the spirit of the present invention. These examples are not to be construed as limiting the scope of the invention as other functionally equivalent means will be readily apparent to those skilled in the art. Representative batch constituents for preparing the novel opal borosilicate glasses of the subject invention are set forth in Table I, immediately below.

TABLE I

| | Batch constituents, grams | | | |
|---|---|---|---|---|
| Ingredients | Ex. 1 | Ex. 2 | Ex. 3 | Ex. 4 |
| Kona Quartz | 310.54 | 71.97 | 319.43 | 74.06 |
| Alcoa A-14 | | 2.33 | | |
| $B_2O_3$ | 48.58 | 11.69 | 49.06 | 11.80 |
| $Na_2CO_3$ | 30.24 | 7.28 | 20.37 | 7.35 |
| $P_2O_5$ | | | 9.75 | 9.84 |
| $NlPO_4$ | 23.20 | | | |
| $aAPO_3$ | | | 19.60 | |

The above batch ingredients, as set forth in the numbered examples, were melted at about 1600° C., for 16 to 20 hours in an air atmosphere. The melts were carried out in platinum-rhodium crucibles heated in an electric furnace. After cooling to room temperature, the freshly formed melts were crushed and remelted for about 16 hours at 1600° C. in an air atmosphere to insure homogeneous glass formation. In Table II, immediately below, the mole percent composition of Examples 1 to 4 are set forth as Exampes 5 to 8 respectively. The coefficient of expansion is listed for the glasses of Examples 5 to 7. Also the glass of Example 7 was heated to 440° C. for 70 hours to produce increased opalescence. Generally, in conventional opal glass, the thermal expansion raises with phase separation in said glass; however, the glass of Example 7 exhibited a decrease in thermal expansion, that is 29.4.

TABLE II.—MOLE PERCENT

| Ingredients | Ex. 5 | Ex. 6 | Ex. 7 | Ex. 8 |
|---|---|---|---|---|
| $SiO_2$ | 81.5 | 78.5 | 83.0 | 80.0 |
| $B_2O_3$ | 11.0 | 11.0 | 11.0 | 11.0 |
| $Al_2O_3$ | 1.5 | 1.5 | | |
| $Na_2O$ | 4.5 | 4.5 | 4.5 | 4.5 |
| $P_2O_5$ | 1.5 | 4.5 | 1.5 | 4.5 |
| Coefficient of expansion (0–300° C.) | 32.3 | | 35.1 | |

The chemical composition, expressed in mole percent, for other representative glasses of the invention are listed in Table III. The glasses were prepared as above described.

TABLE II.—MOLE PERCENT

| Ingredients | Ex. 9 | Ex. 10 | Ex. 11 | Ex. 12 | Ex. 13 | Ex. 14 |
|---|---|---|---|---|---|---|
| $SiO_2$ | 81.5 | 80 | 78.5 | 83 | 81.5 | 80 |
| $B_2O_3$ | 11 | 11 | 11 | 11 | 11 | 11 |
| $Al_2O_3$ | 1.5 | 1.5 | 1.5 | | | |
| $Na_2O$ | 4.5 | 4.5 | 4.5 | 4.5 | 4.5 | 4.5 |
| $P_2O_5$ | 1.5 | 3.0 | 4.5 | 1.5 | 3.0 | 4.5 |

The subject glasses, in addition to possessing the inventive properties discussed above, are further characterized by their ability to become transparent at elevated temperatures, that is at temperatures below the melting temperature. This is believed due to a different rate of change of the index of refraction with increasing temperature for two phases which apparently exist with said glasses. The lower index phase would exhibit greater change in index of refraction than the higher index phase, so at an elevated temperature an apparent transparency is effected due to the apparently then-matched indexes. On cooling, the glasses regain their opal effects. Also, the present glasses have a thermal expansion of about $30 \times 10^{-7}/°$ C. in opposition to conventional opal glasses which possess thermal expansions of about $60 \times 10^{-7}/°$ C. to $90 \times 10^{-7}/°$ C. and are, therefore, suitable for the manufacture of heat-resistant ware. The thermal expansion of the subject glasses endows the glass with resistance to thermal breakage, and they can be heated and cooled more quickly than glasses of higher expansion.

The opal glasses of the present invention are employed in the fields of science, industry and commerce in the form of jars and bottles for therapeutic and cosmetic creams, for deodorant containers, lighting globes, cookware, heat-resistant ware, glass filters and the like.

While the illustrative embodiments of the invention have been described with particularity, it will be understood that various modifications will be apparent and can readily be made by those skilled in the art without departing from the scope and spirit of the invention.

We claim:
1. An opal glass composition wherein said glass consists essentially of 78 to 85 mole percent $SiO_2$, 7 to 11 mole percent $B_2O_3$, 0 to 6 mole percent $Al_2O_3$, 3 to 6 mole percent $Na_2O$, and 1 to 6 mole percent $P_2O_5$, said glass having a coefficient of thermal expansion of about 25 to $40 \times 10^{-7}/°$ C. (0–300° C.).

2. An opal glass composition according to claim 1 wherein said glass consists essentially of 78 to 85 mole percent $SiO_2$, 7 to 11 mole percent $B_2O_3$, 4 to 6 mole percent $Na_2O$, and 1 to 6 mole percent $P_2O_5$.

3. An opal glass composition according to claim 1 wherein said glass consists essentially of 78 to 85 mole percent $SiO_2$, 7 to 11 mole percent $B_2O_3$, 1 to 3 mole percent $Al_2O_3$, 1 to 6 mole percent $P_2O_5$, and 3 to 6 mole percent $Na_2O$.

4. An opal glass composition according to claim 1 wherein said glass consists essentially of 78 to 85 mole percent $SiO_2$, 7 to 11 mole percent $B_2O_3$, 3 to 6 mole percent $P_2O_5$, 3 to 6 mole percent $Na_2O$, and 0 to 3 mole percent $Al_2O_3$.

5. An opal glass composition according to claim 1 wherein said glass consists essentially of 78 to 85 mole percent $SiO_2$, 7 to 11 mole percent $B_2O_3$, 0 to 6 mole percent $Al_2O_3$, 3 to 6 mole percent $Na_2O$, and 1 to 6 mole percent $P_2O_5$, and wherein the total $B_2O_3+P_2O_5$ is from 8 to 17 mole percent, the total $SiO_2+B_2O_3$ being from 85 to 96 mole percent, and the total $SiO_2+Al_2O_3$ being from 78 to 88 mole percent.

6. An opal glass composition wherein said glass consists essentially of 80 to 85 mole percent $SiO_2$, 9 to 11 mole percent $B_2O_3$, 1 to 3 mole percent $Al_2O_3$, 4 to 6 mole percent $Na_2O$, and 1 to 6 mole percent $P_2O_5$, said glass having a coefficient of thermal expansion of about 25 to $40 \times 10^{-7}/°$ C. (0–300° C.).

7. An opal glass composition wherein said glass consists essentially of 80 to 85 mole percent $SiO_2$, 9 to 11 mole percent $B_2O_3$, 4 to 6 mole percent $Na_2O$, and 1 to 5 mole percent $P_2O_5$, said glass having a coefficient of thermal expansion of about 25 to $40 \times 10^{-7}/°$ C. (0–300° C.).

References Cited
UNITED STATES PATENTS

| 3,275,492 | 9/1966 | Herbert. | |
| 2,466,849 | 4/1949 | Hood et al. | 106—54 |
| 2,480,672 | 8/1949 | Plank | 106—54 |

HELEN M. McCARTHY, Primary Examiner

U.S. Cl. X.R.

106—39

PO-1050
(5/69)

UNITED STATES PATENT OFFICE
CERTIFICATE OF CORRECTION

Patent No. 3,506,464      Dated April 14, 1970

Inventor(s) Baak & Rapp

It is certified that error appears in the above-identified patent and that said Letters Patent are hereby corrected as shown below:

Column 2, line 54, "NIPO$_4$" should be - - - ALPO$_4$ - - -.
Column 2, line 55, "aAPO$_3$" should be - - - NAPO$_3$ - - -.
Column 3, line 15, "Table II" should be - - - Table III - - -.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents